(12) United States Patent
Czechowicz et al.

(10) Patent No.: US 7,032,399 B2
(45) Date of Patent: Apr. 25, 2006

(54) MODULAR ROOFTOP AIR CONDITIONING SYSTEM MOUNTING ARRANGEMENT

(75) Inventors: Belin Czechowicz, Dewitt, NY (US); Michael A. McDorman, Wolcott, NY (US); Robert C. Reimann, LaFayette, NY (US); Timothy R. Campbell, Marcellus, NY (US)

(73) Assignee: Carrier Corporation, Syracuse, NY (US)

( * ) Notice: Subject to any disclaimer, the term of this patent is extended or adjusted under 35 U.S.C. 154(b) by 12 days.

(21) Appl. No.: 10/948,115

(22) Filed: Sep. 23, 2004

(65) Prior Publication Data

US 2006/0059932 A1 Mar. 23, 2006

(51) Int. Cl.
*B60H 1/32* (2006.01)

(52) U.S. Cl. ................. 62/244; 62/DIG. 16; 224/326; 454/129; 454/136

(58) Field of Classification Search .............. 62/244, 62/DIG. 16; 454/129, 136; 224/324–327
See application file for complete search history.

(56) References Cited

U.S. PATENT DOCUMENTS

| 2,810,334 | A | * | 10/1957 | Perks et al. | ................... | 454/95 |
| 3,195,439 | A | * | 7/1965 | Stratton | ....................... | 454/136 |
| 3,955,848 | A | * | 5/1976 | Lutz et al. | .................. | 296/218 |
| 4,113,302 | A | * | 9/1978 | Bos | ............................ | 296/217 |
| 4,662,671 | A | * | 5/1987 | Davis | .......................... | 296/217 |
| 4,901,902 | A | * | 2/1990 | Stapleton | .................... | 224/326 |
| 5,439,152 | A | * | 8/1995 | Campbell | ................... | 224/405 |
| 5,673,832 | A | * | 10/1997 | Whalen | ....................... | 224/328 |
| 5,791,156 | A | * | 8/1998 | Strautman et al. | ............ | 62/244 |
| 6,468,147 | B1 | * | 10/2002 | Thomas | ....................... | 454/136 |

* cited by examiner

*Primary Examiner*—William E. Tapolcai
(74) *Attorney, Agent, or Firm*—Niro Scavone Haller & Niro

(57) ABSTRACT

A system and method for mounting one or more air conditioning modules to the roof of a bus is disclosed. The system and method includes standardized, modular air conditioning modules which are capable of fitting a wide variety of bus geometries, and are attached to the bus roof by a set of rails which are fastened to the roof, the rails having flanges and a length which are tailored to the bus roof configuration so as to provide a standardized alignment by capturing the roof rail in a channel shaped formation.

4 Claims, 3 Drawing Sheets

Fig. 2

Ⅰ. FIELD OF THE INVENTION

The field of the present invention relates to an all electric modular bus rooftop air-conditioning unit. More specifically, the present invention relates to a system and method of mounting rooftop air conditioning units for buses in a modular fashion, whereby the units are used to air condition the passenger compartment of buses and coaches.

Current bus roof top products employ roof rails individually under components and use a "Z" style cross section. Furthermore, other prior approaches to dealing with rooftop air conditioning mounting include the use of modular bus roof sections. However, prior approaches have had shortcomings in that they do not provide for a uniform approach to mounting an air conditioning unit in a modular fashion without regard for the bus geometry (e.g., the length or curvature of the roof). Due to different market and application requirements, multiple rooftop unit types are used to meet the different requirements and vehicle interfaces.

Thus, there is a need for a standardized system and method of installation for bus rooftop air conditioning units which do not use any ad hoc approaches and are still able to meet the different requirements of the different applications in the bus air conditioning market.

Furthermore, there is a need for a system and method which standardizes parts for a rooftop bus air conditioning unit, thus reducing costs of installation and maintenance.

In addition, there is a need for a bus rooftop air conditioning system using a flexible design and components to adapt the system to different applications.

These and other needs and objects of the present invention will become apparent in light of the summary and detail description of the invention as follows.

II. SUMMARY OF THE INVENTION

The system and method of the present invention uses one or more modular base units for attachment to a set of prepositioned rails which have been mounted to the roof of the bus, the rails traversing the cross ribs of the bus roof, as well as having sufficient length to accommodate the module or system length requirements. The rails are further chosen in cross-section according to the particular roof application, e.g., roof radius and shape. The rails preferably include fasteners to fix the rails to the bus, as well as holes for affixing the modular base unit(s) via fastener. In addition, the rails preferably include holes located in the vertical web to provide clearance for a given module's condensate drain tubes, as well as holes for the drainage of water that might collect "uphill" of the rail on a curved roof.

Once the rails are affixed to the bus roof, the modules, having been prepared by the appropriate sealing means, are lowered onto the roof rails, which provide location and alignment by capturing the roof rail in a channel shaped formation. The system can also include fasteners to secure a given base unit module to the rails for subsequent ease in removal for servicing or replacement. Thus, a given module can be "popped out" in the event of malfunction or service requirements and replaced by a unit which, by virtue of the modular nature of the system, is identical.

These and other features, aspects and advantages of the present invention will be better appreciated and understood by referring to the following detailed description of the preferred embodiments and claims.

III. BRIEF DESCRIPTION OF THE DRAWINGS

IV. BRIEF DESCRIPTION OF THE PREFERRED EMBODIMENT

Figure 1:
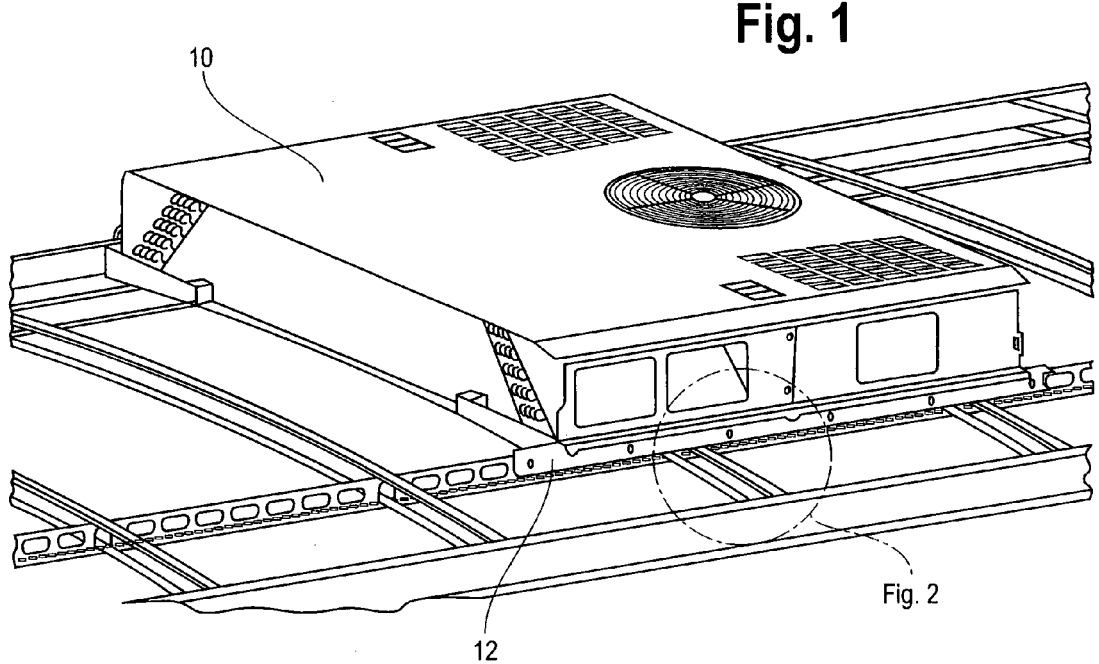
FIG. 1 is a perspective drawing of an embodiment of the system of the present invention showing the base unit module in place upon the roof rails, wherein the system has been placed upon a roof and the bus roof skin is cut away to show the cross-rib structure.
Figure 2:
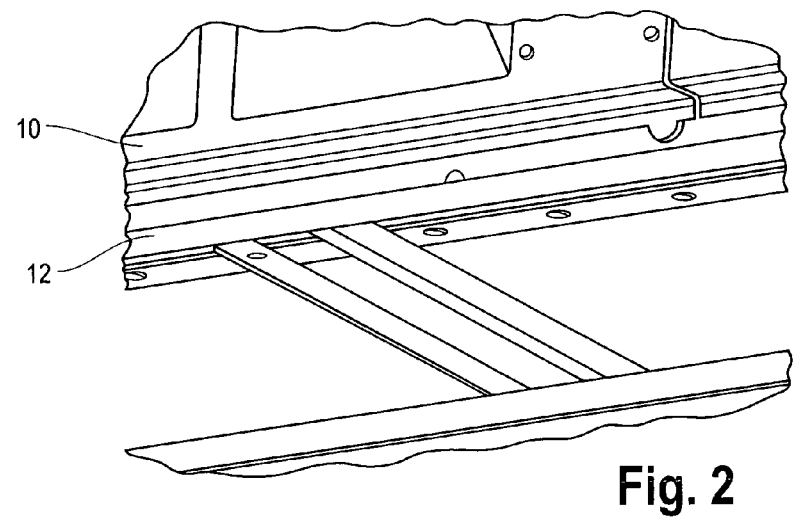
FIG. 2 is a perspective drawing of a detail of FIG. 1 block diagram showing the engagement of the base unit module and rails of a preferred embodiment of the present invention.

Referring to FIGS. 1 and 2, the central part of the modular rooftop unit is the base unit module 10. The base unit module 10 contains the complete refrigeration circuit (not shown) including the evaporator coil, the condenser coil and the compressor, which is powered by an on board inverter/controller (again, not shown) or external power source. A key to the most preferred embodiment of the base unit module 10 is that it is standard in all applications, both in terms of dimensions and basic configuration. Base unit module 10 is designed to traverse the entire width of a bus roof, and attaches to the bus roof through a set of rails 12. The base unit module 10 accommodates the required variability in bus roof geometry (e.g., curvature) and supply and return air openings. The module is designed such that it can be combined with other modules to form a complete system, which is modular and totally flexible in arrangement on the roof of a bus or other vehicle requiring air conditioning.

Figure 3:
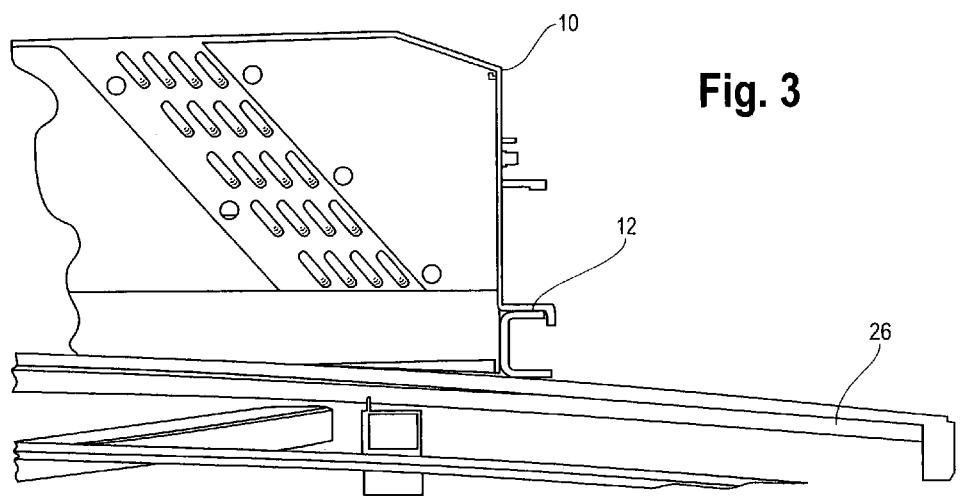
FIG. 3 is a partial front view of an embodiment of the system of the present invention showing the engagement of the module structure, roof rails, and the roof skin and cross rib.
Figure 4:
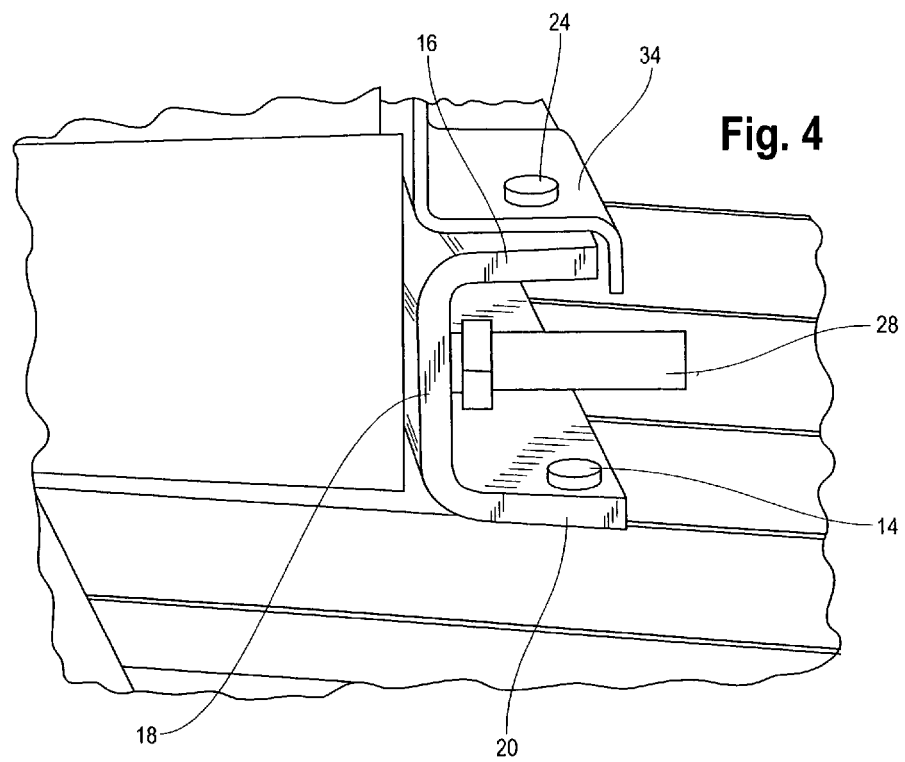
FIG. 4 is a partial front view of an embodiment of the system of the present invention showing the capturing engagement of the rails and the module, the fasteners used with the system, and an aperture for a condensate drain of the module.

Referring to FIGS. 3 and 4, in order to easily align, locate and attach the module (or modules), a set of roof rails 12 is first affixed with fasteners 14 to the roof of the bus in predetermined locations. The rails 12 are chosen in length to traverse the structural cross ribs of the bus as well as according to module or system length requirements. It is important to always distribute the module load over these ribs and securely fasten the system to them, as the roof skin 18 material is generally thin and flexible, and might not be expected to support securely a base unit module 10 by itself.

The rails 12 are most preferably aluminum for corrosion resistance, light weight, extrudability and ease of manufacture. Each rail has appropriately located module holes 22 in the top flange 16 for affixing the module(s) via fastener 24, appropriately located vehicle holes 26 in the bottom flange 20 for affixing the rails 12 to the bus roof via appropriate fastener 14, appropriately located condensate drain tube holes 28 in the vertical web to provide clearance for the module condensate drain tubes 30 and, appropriately located roof drainage holes 32 in the bottommost portion of the vertical web to provide drainage for any water that may collect "uphill" of the rail on the curved roof.

Once the rails 12 are affixed to the roof, the module(s) 10, having been prepared with the appropriate sealing techniques as understood by those of ordinary skill in the art, are lowered onto the roof rails 12, which provide location and alignment by capturing the roof rails 12 laterally in a channel shaped sheet metal and plastic formation. Fasteners then secure the module to a given roof rail 12 for subsequent ease in removal for servicing or replacement. The module further may optionally include a flange structure 34 which facilitates the capturing engagement of the module 10 with the roof rails 12.

Figure 5:
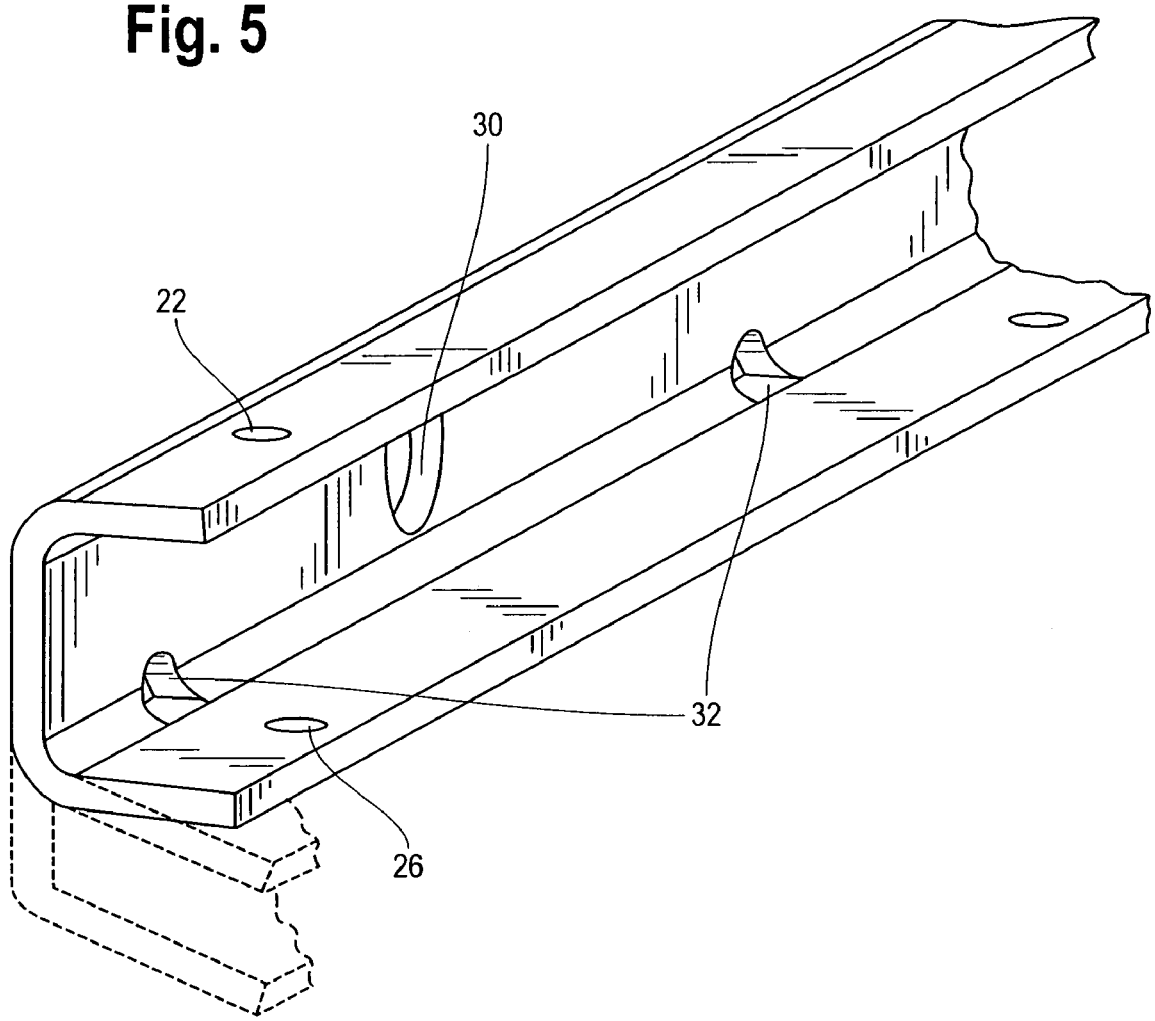
FIG. 5 is a partial perspective view of a preferred embodiment of the rails used in the present invention showing the condensate drain and rail web aperture features, as well as the variable flange angle and length features to accommodate various bus geometries in the use of the present invention.

Referring to FIG. 5, the rails 12 most preferably include a top flange 16, a vertical web 18, and a bottom flange 20 and are chosen in cross-section according to the particular roof application (see FIG. 5 showing flange angle (A) and vertical web 18 height variability (B)) according to roof radius and shape. A smaller radius roof may require steeper flange angles and higher web lengths than a larger radius or flatter roof. The basic, most preferred cross section for such rails is (roughly) a "C shape," although those of ordinary skill in the art will understand that deviations from that shape can be made while still achieving some or all of the objects of the present invention.

It is obvious that these rails can be configured in many arrangements depending on a multitude of bus roof geometries, the number of base unit modules, the placement of base unit modules relative to one another, application specifics, and the like. It is envisioned that the design of the rails 12 would be limited to several widely used cross sections and lengths as dictated by the variable bus applications. Extrusions would facilitate this as they would just have to be cut to the various length requirements.

It will be appreciated by those skilled in the art that various changes, additions, omissions, and modifications can be made to the illustrated embodiments without departing from the spirit of the present invention. All such modifications and changes are intended to be covered by the following corresponding claim language.

We claim:

1. A modular rooftop mounting system for mounting an air conditioning module to a variety of different rooftop configurations, said system comprising:
 a) a plurality of rails, said rail including a bottom portion for contacting a vehicle roof and a top portion for mating with and supporting said air conditioning module;
 b) a series of apertures in the top portion of said rails for receiving fasteners therethrough to secure said air conditioning module to said rails; and
 c) a second set of apertures for receiving fasteners therethrough to secure said rails to a given roof configuration;
 whereby said rails are set upon the rooftop so as to provide a standardized mating and supporting surface for said air conditioning module regardless of the rooftop configuration.

2. The system of claim 1, wherein said rails further include at least one condensate drainage aperture for receiving a condensate drainage tool from said air conditioning module.

3. The system of claim 1, wherein said rails are of sufficient length to mate with a plurality of air conditioning modules.

4. The system of claim 1, wherein said rails further include at least one roof drainage aperture to permit water to flow off said roof through said rails.

* * * * *